United States Patent Office 3,152,071
Patented Oct. 6, 1964

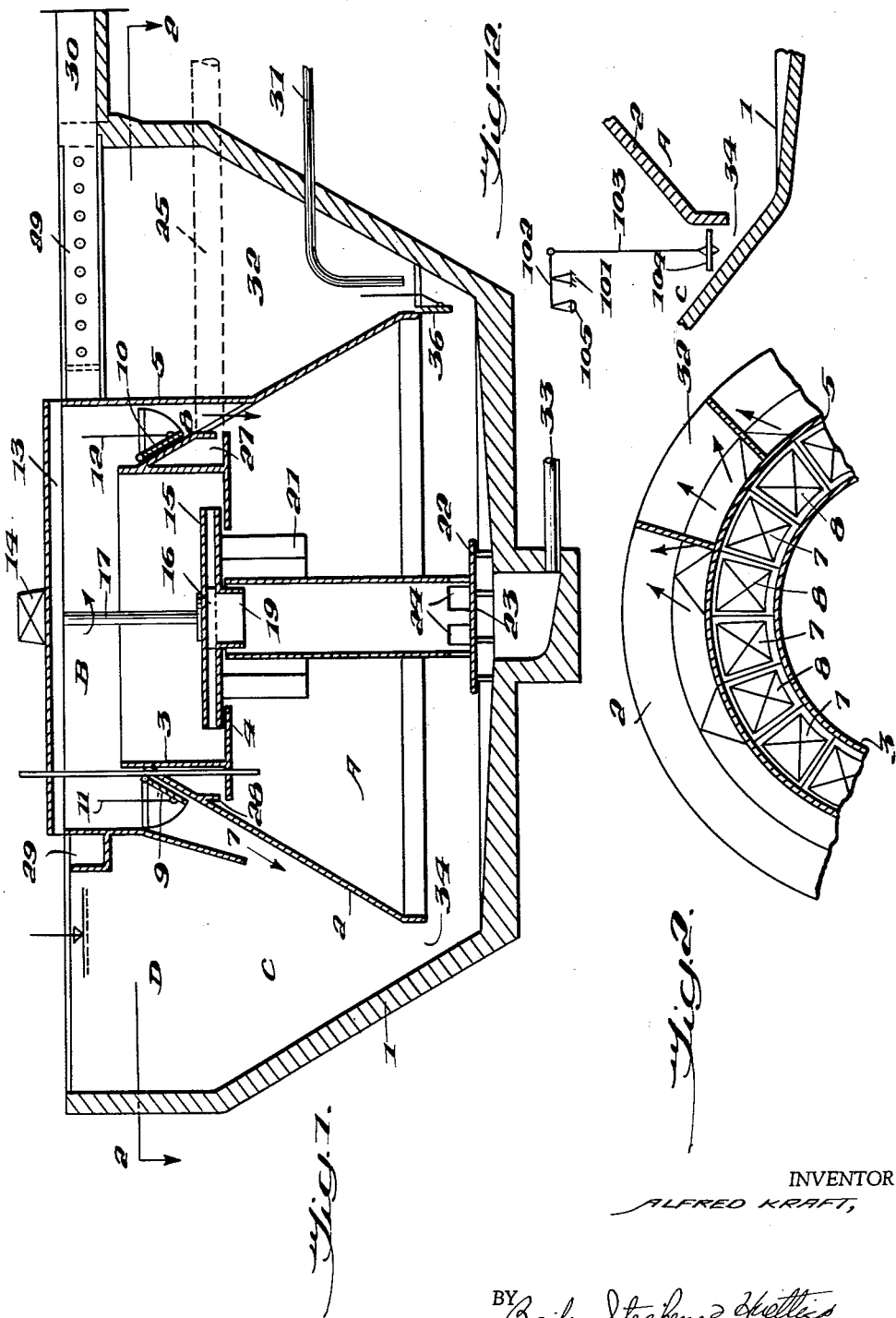

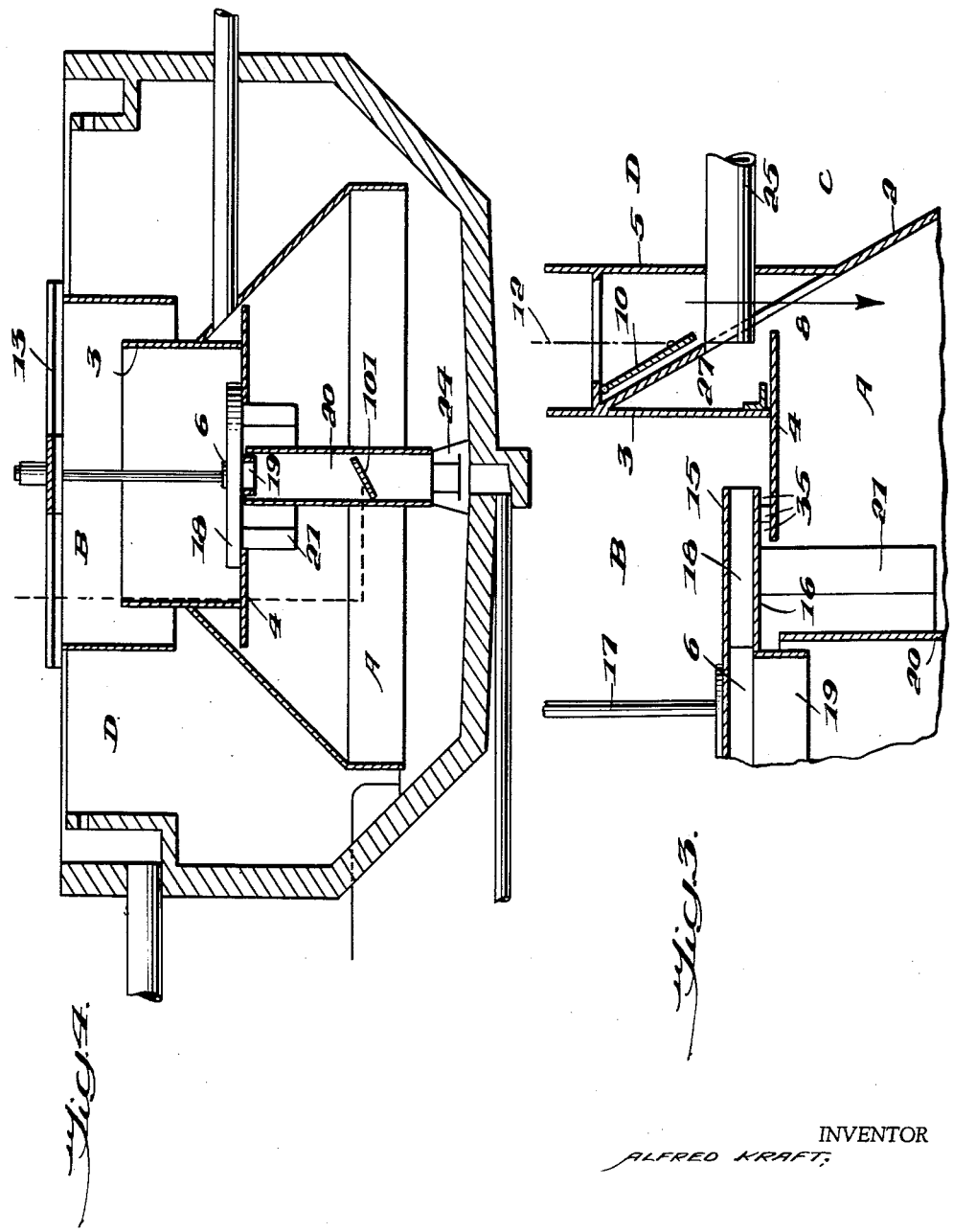

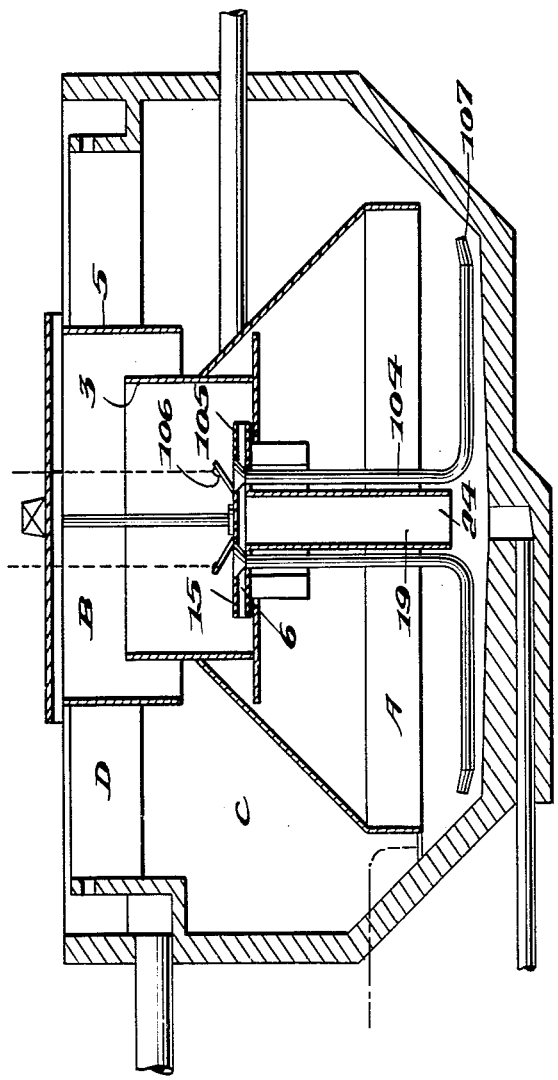

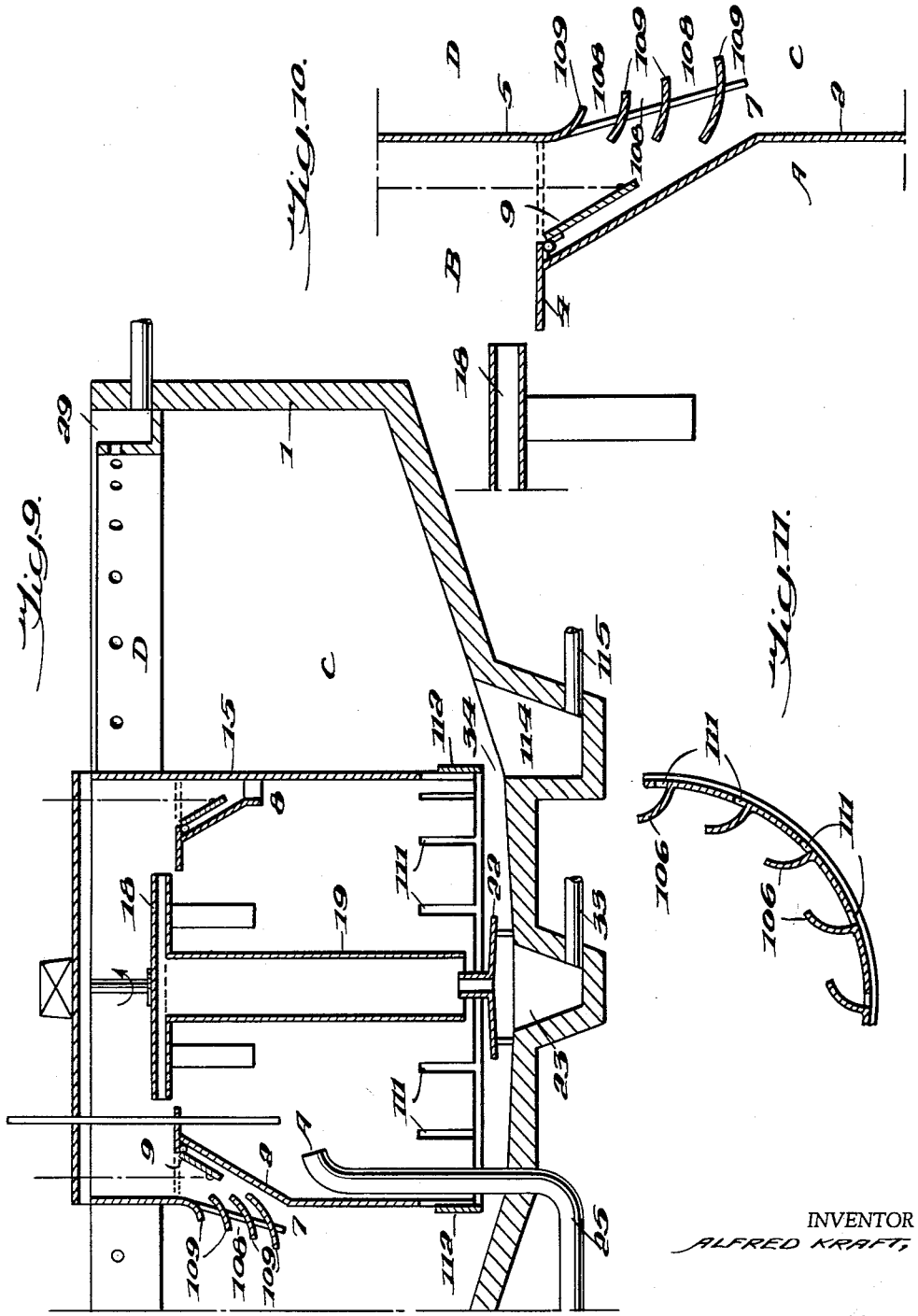

3,152,071
APPARATUS AND PROCESS FOR THE SEPARATION OF SOLID PARTICLES FROM FLUIDS
Alfred Kraft, Schonberger Feld 3, Kronberg, Taunus, Germany
Filed Dec. 11, 1961, Ser. No. 158,441
19 Claims. (Cl. 210—20)

The invention relates to a process and apparatus for the separation of solid particles from fluids.

The procedures presently in use commercially for the clarification of fluids by the separation of solid particles contained in them, especially for use in water purification, are the sludge-blanket process and the suspension-circulation process. In both procedures the fluid to be treated is mixed with a flocculating means, such as a flocculating medium, and mixed thoroughly with the slurry resulting in the process, so that the ability to settle out of the flocculate produced is considerably improved.

In the sludge-blanket process the raw fluid, after mixture with the flocculating medium, has the flocculate-containing sludge passed from below upwardly through a sludge blanket, which has an upwardly increasing cross-section. The resulting flocculate in this way settles on the already present flocculate, so that at the fluid surface of the clarification basin a well-purified fluid can be withdrawn.

In the suspension-circulation process a larger quantity of fluid enriched with the solids resulting in the process is pumped in a circuit through several zones separated from one another in the clarification basin by means of structural elements. In this circuit, the raw water and the chemicals are led together into an inner mixing zone and out of a peripheral clarification and sedimentation zone to remove the clarified fluid at the upper edge and the excess solids at the lower part of the apparatus.

The two processes are quite satisfactory to assure a turbidity of less than 10 p.p.m. in clarified water, but they are quite susceptible to disturbances, which arise through changes in the operating conditions, for example, through changes of the input of raw water per unit of time, the solid content of the raw water, its flocculate content, its temperature and the like. Such changes in operation affect the reaction time and thereby the necessary time for the treatment and lead to too high turbidity in the treated fluid or to deposits of sludge in the clearing basin, which become inactive through aging or putrefaction.

It has also been observed that, in a plant constructed for use in the sludge-blanket process, if any change in the basic operating conditions, for example, an increase in the turbidity of the raw water, occurs, the projected through-put or the required purity of the water being treated, cannot be maintained, so that the suspension-circulation process appears preferable. On the other hand, in operating according to the suspension-circulation process, it has been observed that with seasonal decreases in the raw water temperature of the treated water, an after-reaction with the fresh formation of sludge takes place, because the contact operation of the flocculate provided, or the time of treatment of the raw water in the plant, is no longer sufficient. In this respect, the sludge-blanket process is more efficient.

A conversion from one process to the other in the apparatus heretofore known is not possible.

In the transfer of the suspension-circulation process, which is carried out in round basins, into rectangular, especially elongated clarification basins, it has been proposed, in order to avoid short circuit streams, to branch the suspension circulation into two partial streams, so that one partial stream is led through a mixing zone, a pressure chamber and through a sedimentation and clarification zone, while the second partial stream is led only through the mixing zone and the pressure chamber. By variation of the two partial streams with respect to each other, the larger partial stream can be discharged to such an extent that the dynamic separation (which is characteristic of the suspension-circulation process) of the clear water out of the suspension stream, which is downwardly directed in the sedimentation zone occurs without difficulty, without forcing the raw water out of the cycle and without its flowing in the shortest path from the inlet to the outlet.

This sub-division of the recirculating stream used especially for elongated basins into two circuits has in round basins only a slight range of variation, within which an operative suspension-circulation through all the zones with sufficient dynamic separation in the clarification and sedimentation zones can exist.

It has been found that, by the use of suspension-circulation divided into two partial streams in round basins, the two partial streams can be so controlled with respect to each other that in the peripheral sedimentation zone at will either a downwardly or upwardly-directed stream can be produced.

Whereas the downwardly-directed flow corresponds to the suspension-circulation process, with upwardly-directed flow the procedure corresponds operatively almost to the sludge-blanket process and is transformed into this if back-flow from the sedimentation zone into the mixing zone no longer takes place.

It has surprisingly been found that these two modes of operation do not constitute rigid alternatives to each other, but that conditions can be adjusted between them in which an upwardly-directed and a downwardly-directed stream over-lap. By a simply arranged conversion from suspension-circulation to sludge-blanket, and vice versa, the selected intermediate conditions give a substantial improvement of the effective time of treatment while avoiding short-circuit streams and an installation meeting the highest requirements of the process independent of the speed of the agitators and pumps. The energy-wasting stepless control of the motor of the agitating arrangement is unnecessary.

The primary object of the invention is to provide a procedure which combines the sludge-blanket process and the suspension-circulation process in such a way as to combine the advantages of both while avoiding their drawbacks, and to provide apparatus capable of carrying out the process.

A further object of the invention is to provide a procedure in which selectively and infinitely variable adjustment and operation of the sludge-blanket and/or the dynamic separation process is possible while meeting the technical requirements of both.

Another object of the invention is to provide a procedure in which the sludge-blanket process and the suspension-circulation process go on simultaneously, with improvement of the effective dwell time and reduction of disturbing turbulence in the clarification zone, resulting in better reaction and clarification effects and increase of the throughput.

An additional object is to provide for pulsating operation and/or overlapping rotational flow in the clarification and sedimentation zones.

Still another object is to provide for removal of the deposits of solids at the bottom of the basin or selective separation of larger solids such as sand from the suspension through use of an induced hydraulic removal effect to a central sump in the basin bottom.

It is also an object to provide for increasing the effective dwell time or the chemical reaction and thus gaining a more efficient effect of the predominantly heterogeneous, time dependent chemical reaction of the first or higher order. Simultaneously, the physico-chemical side reactions (coagulation, sedimentation) are improved.

Still a further object is to improve the mixing effect in the primary zone while at the same time avoiding short circuit flows as prerequisites for a better progress of the reaction.

Another object is to provide selective adjustment of the quantity of suspension backflow in the sludge-blanket or suspension circulation procedure without producing disturbing turbulence in the sedimentation zone and without detriment to the mixing effect in the primary zone.

It is likewise an object to provide mechanical and hydraulic arrangements for improving the sedimentation of solids and increasing the sludge concentration in the sludge pockets or the settling in the bottom sump; and for preventing disturbing turbulence in the sedimentation and clarification zones.

Finally, the object is to provide a mechanism which is simple in construction and low in price.

Further objects and advantages of the invention will appear more fully from the following description, particularly when taken in conjunction with the accompanying drawings which form a part thereof.

In the drawings:

FIG. 1 shows in cross-section an apparatus for carrying out the invention;

FIG. 2 is a sectional view of a portion of FIG. 1 on the line 2—2;

FIG. 3 is an enlargement of a part of FIG. 1;

FIG. 4 shows in cross-section a modified device according to FIG. 1;

FIG. 5 shows a detail of a modification;

FIG. 6 is a further detail;

FIG. 7 is a further detail;

FIG. 8 shows in cross-section a further modification of the device of FIG. 1;

FIG. 9 shows in cross-section a portion of a further modification;

FIG. 10 is an enlargement of a part of FIG. 9;

FIG. 11 is a cross-section through a detail of another construction;

FIG. 12 shows the arrangement for testing the flow content in the space between the mixing and sedimentation zones.

The arrangement according to FIG. 1 consists of a round basin 1, the cross-section of which is reduced at the lower part, and which has a slightly conical bottom. The interior of this basin is divided by concentric wall structures 2, 3, 4 and 5, into a mixing zone A, a distribution zone B, a sedimentation zone C and a clarification zone D. By means of a rotor-impeller 6, the fluid from the mixing zone A is passed into the distribution zone B and goes from there in part through passages 7 into the sedimentation zone C and in part through passages 8 back into the mixing zone. The transverse cross-section of passages 7, 8 can be changed by valves 9, 10 and either one can, if desired, be closed. The openings for the channels or passages, which are variable by means of the valves, as shown in FIG. 2, are arranged in a ring between the concentric structural walls 3, 5 alternating with each other. The valves 9, 10 can be operated by means of rods 11, 12 from the frame of the machine on which also the driving motor 14 for the rotor-impeller is arranged.

The rotor-impeller 6 consists of two parallel plates 15, 16 on a shaft 17. The space 18 between the plates is connected by a draft tube 19 to the interior of the tube 20 into which the draft tube extends. Outside of the pipe 20 the lower plate 16 is provided with agitating blades 21. The pipe 20 rests on a plate 22 above a sludge-sump 23 and is provided at its lower end with lateral suction openings 24. The raw fluid to be treated is let in through the pipe 25 into a space 27 divided off by the walls 3, 2 and the ring plate 4. From space 27 a slit 28 leads into the mixing zone A.

The treated fluid is removed in a known way by radial and peripheral separating troughs 29 from the fluid surface of the clarification zone by pipe 30. The excess of solids is drawn off by means of a pipe 31 either from the sedimentation zone C itself or from sludge pockets 32 arranged in the sedimentation zone and provided each with a bottom valve 36. Sediment of larger size is intermittently drawn off through a pipe 33 from the sump 23.

In operation the rotor-impeller 6 by means of the draft tube 19 sucks a mixture of liquid and solids through the draft tube 19, pipe 20 and openings 24 from the container bottom and forces this between plates 15, 16 through immediate space 18 into the distribution zone B. In this zone the mixture, because of the under-pressure at the bottom, goes through passage 7 and the sedimentation zone C back to the mixing zone A or through passages 8 along the inner side of the wall 2 back to the mixing zone A. Both streams pass in the neighborhood of the passage connection 34 between the zones A and C at the bottom of the container. The large agitating plates 21 impart to the contents of the mixing zone A outside the pipe 20 an axial flow with mild turbulence, which drives the mixture returning through the passages 8 and the raw water entering through the slit 28 in a helical flow downwards on the inside of the wall 2, with which the stream flowing back from the zone C mixes, and in the inside of the zone A is led upward around the pipe 20 insofar as this mixture is not sucked in through the openings 24 and transferred to the zone B. Through this flow in the zone A an extraordinary improvement of the effective dwell time is obtained.

In the circulation through the zones A, B, C, a part of the water corresponding to the quantity of raw water fed in is withdrawn, is clarified in the zone D, which is not agitated or disturbed by the current, and then is taken off by the gutters 29 and outlet 30.

In an extreme case the passages 8 are closed, so that the whole of the fluid circulated by the rotor-impeller 6 passes through the zones A, B and C. The movement and mixing functions of the rotor-impeller are then joined. The movement operation is so regulated that no turbulence in the zone C reaches the zone D. The mixing function can then be concentrated in the zone A, so that in addition to the risk of sludge deposits on the container bottom, the possibility that raw water will pass into zone D without going through the whole cycle increases. This means too short a dwell time. The passages 7 can serve advantageously for increasing the dwell time for the escaping clarified water, because the water coming out of them has to travel a relatively long path in order to reach the gutters 29.

By a partial opening of the passages 8 and a corresponding reduction of the transverse cross-section in the passages 7, the circuit through the zones A, B and C can be decreased, because then a second circulation is formed through the zones A, B and the passages 8. A distinct separation of the mixing operation and the movement function follows from the arrangement of the pipe 20 and in connection with the draft tube 19 by the rotor-impeller 6, because thus a back-flow of the two partial streams in the neighborhood of connection 34 between zones A and C to the bottom of the container is achieved.

The other extreme case is when the passages 7 are closed and only the passages 8 are open. Then there is only a circulation through the zones A and B, and a part of the circulated mixture corresponding to the amount of raw water brought in passes through the connection 34 from below into zone C and by rising in the zone D corresponds to the known sludge-blanket process.

The closing of passages 7 or 8 can change the type of operation from the sludge-blanket process to the suspension-circulation process or vice-versa at will.

Between these extreme cases there are, however, many intermediate conditions possible in which the zone C simultaneously receives both from above through the passages 7 and also from below through the connection 34, mixture which has circulated through the zones A and B. The result is that in the zone C a mild rolling eddy is formed, and (from the point of view of the suspension-circulation process) and increase of the solids concentration in the zone C, and (from a point of view of the sludge-blanket process) a concentration of the larger solid particles in the upper layers of the sludge-blanket results. The passages 7, which lead the fluid stream from the distribution zone B downwards into the sedimentation zones C increase substantially the path of the fluid rising in the clarification zone D and thus produce a further increase of the dwell time.

In practising the invention, it is desirable to control properly the volume of circulation in the partial streams and in the mixing zone A. This is especially the case if the mixture fed into the zone B is withdrawn in the neighborhood of the container bottom. This happens through the arrangement of the pipe 20. In order to exclude an excess of the mixture circulating in the zone A outside the pipe 20 from flowing into zone B, or vice versa, there may be provided, as shown in FIG. 3, between the lower plate 16 of the rotor-impeller 6 and the plate 4 a labyrinth packing 35. FIG. 3 also shows how the raw water inlet passes through the walls 2 and 5 into the distributing chamber 27.

The infinite variability of the transverse cross-section of the passages for the circulating fluid makes it possible to use a constant drive motor for the rotor-impeller 6, so that the use of a speed changer is unnecessary. In addition to this, in order to throttle the passages between the zones, other arrangements than valves can be used, for example, a back-flow arrangement.

If it is desired to throttle the cross-section of the suction pipe leading to the rotor-impeller 6, this can be done by a simple throttle valve 101 (FIG. 4) operated by a rod, which controls the amount of fluid sucked in by the rotor-impeller at constant speed.

FIG. 5 shows the throttling of the suction openings, in which the rotor-impeller 6a operating at constant speed and to which the pipe 19a is connected is mounted for vertical adjustment in the pipe 20a, so as to close more or less the openings 24a in the bottom of the pipe.

In the modification of FIG. 6, the flange 102 surrounding the rotor-impeller 6 makes it possible by adjusting the height of the rotor or of the vertical adjustable flange 102, to vary the output of the water and thus the suction.

In the form of FIG. 7, adjustable valves 103 in the plate 4, similar to the valves 10, by means of which the rate of feed of the rotor-impeller or of backflow can be varied.

The following are examples of several operations possible according to the invention:

*Example 1*

It will be understood that, through opening the valves 9, 10 in a predetermined sector of the zone C a downwardly directed current can be produced whereas in another sector an upwardly directed current exists, so that, in conformity with the sludge-blanket process, the sludge pockets can be filled from above. The result is that the full concentration of the circulating suspension is fed into the sludge pockets, so that a concentration which can be as high as 6% by weight of the sludge in some apparatus such as a decarbonization arrangement is obtained.

*Example 2*

For reaching a still higher sludge concentration in the sludge pockets, operating by the sludge-blanket process (while preserving the current direction according to Example 1) as well as by the suspension-circulating process, one passage 7 is coordinated with one of the sludge pockets. Through cyclic interchangeably shutting off of the feed of the suspension into the pockets by means of one of a valve 9, the sludge fed in is given a selectively adjusted time for further thickening, so that through the sludge outlet a considerably thickened sludge, for example as heavy as 10% by weight, can be drawn off.

*Example 3*

By means of periodic switching of the valves 9 and 10, a pulsating suspension-circulation or pulsating sludge-blanket process can be carried out, so that in special cases the flocculation, because of the influence of the movement of water particles relative to the flocculate, is improved, and also the precipitated flocculate is easily washed from the structural parts and the walls of the basin. The pulsating current has the result that with closed valves 9, 10 a predetermined quantity of water pumped into zone B is dammed up there, which through periodic opening of the valves 10 gives a pulsating sludge-blanket process. If on the contrary, with valves 10 closed, valves 9 are periodically opened, there is a pulsating suspension-circulation process.

*Example 4*

In consequence of the vigorous rotational movement in the zone A, which is produced by the agitating blades 21, there results the known physical effect of the centrally-directed transverse current at the bottom of the basin. Furthermore, the centrifugal flow which is produced by the operation of the pump and the agitator in the zone A through the suction openings 24 is so directed that it flows across the bottom of the basin centrally to the central axis. Besides the reversely-directed current through the space 34 out of the zone C is led over the bottom of the basin.

Through this cooperation of the three currents (transverse current, centripetal current and back-flow) in connection with the rotational current, there results a very intensive spiral current over the surface of the basin bottom, so that deposits, especially of sand, are carried along and driven across the completely smooth bottom to the outtake opening cross-section of 24 and the diameter of pipe 20, the flow of speed proper for the operation of the apparatus is so adjusted that flocculate and finer deposits up to about 0.5 mm. in grain size are taken up and circulated, while larger sand particles, which are likely to interfere with the concentration effect, are washed by the spiral current to the sump 23 and are taken off by pipe 33 as necessary.

Through the full uses of these resulting effects, the following usual expedients are not necessary:

(1) A sharp slope of the bottom of the basin, in order to let the sludge slip better to the center.

(2) Slow-moving additional scrapers to move the sludge to the discharge.

(3) Separate sand-traps to hold back sand.

But especially the flocculation and sedimentation product characteristic of the reaction effects are maintained constantly in circulation.

These procedures can be carried out in widely-varying ways, for example, through conversion of existing equipment for carrying on the conventional suspension-circulation process.

In FIG. 8 is shown how the suspension is sucked through the rotor-impeller 6 by the draft tube 19 and the pipe 20 from the bottom of the basin 1 and moved into the zone B. Instead of the passages shown in FIG. 1 and their valves 10 (and, if desired leaving out the passages 7 and valves 9), the suspension is now led either only between the cylindrical inserts 3 and 5 or through the passages 7 into the zone C, or by one or several back suction pipes 104 is returned in the zone A. The pumping action of the back-suction pipes 104, which extend at a short distance above the bottom of the container horizontally outwardly, is determined by the speed of the rotor-impeller 6, and the number and cross-section as well as the horizontal length of the back-suction pipes 104. Maximum possible back-flow is so selected that the feeding capacity of the rotor-impeller is somewhat exceeded, so that in zone C an upward current results and corresponds with the sludge-blanket process.

Through throttling of inlet 105 with valves, foot valves or other closure elements 106, the backflow is adjusted as desired, or completely cut off, so that the selected adjustment or conversion to the suspension-circulation process or any desired intermediate arrangement is possible.

A useful secondary effect is that sludge suspended on the bottom of the basin, which is not picked up by the rotational movement of the rotating impeller 6, washes away the suspension stirred up by the horizontal back suction nozzles 104 on coming out through the radial, axial or slanting nozzles 107 at the under ends of the back suction pipes 104, and in the suction stream is led off to the openings 24.

A mechanical speed control or transmission for the rotor-impeller 6 is unnecessary.

The use of the heretofore-described process may raise some difficulties, if the incoming raw water contains large quantities of heavy or hard-to-handle solid materials, or flows in sharply fluctuating quantities, or with fluctuating pH value, as is the case in industrial waste waters of the steel and smelting industries or paper factories or metal pickling in connection with neutralization.

The addition of flocculating media and the improvement of the coagulation effect through the described operating technique are primarily of advantage for the clarification of water, but sometimes produce secondary disturbances if the resulting sludge quantity is too voluminous or in connection with the sedimentation produces hydraulic disturbances, or for preventing too great water losses the solid material separation must be carried to a high sludge concentration.

It has been shown that the quantity of suspension flowing downwardly through the passage 7 into the sedimentation zone C occasionally forms at the outlet edge of the passage 7 a separating swirl, which leads to a noticeable increase of undesired turbidity in the clarification zone. Also, from operating structural considerations, a laminar and as far as possible disturbance-free conduction of this current into zone C is not always possible, because the Reynolds number in general lies at around 10,000 and thereby results in a turbulent flow.

These two defects are in consequence of theoretical considerations and experiments eliminated in a simple way. The intensity of the separating swirl is $$I = k \cdot \frac{w^2}{r} \quad (1)$$

whereas the Reynolds Index serves as an indication for laminar or turbulent flow.

$$Re = \frac{w \cdot L}{v} \quad (2)$$

Thus the Reynolds Index for the alteration of laminar to turbulent flow because of the influence of the surface area S and the circumference U at the outlet of the passages 7 as well as because of the character of the suspension, must be determined experimentally, Assume $w$=speed of current in passage 7 in meters per second $r$=radius of curvature of the under edge of channel 7 in meters $L$=the depth of the channel 7 in meters $v$=the kinematic viscosity of the suspension=a constant times square meters per second.

Equation 1 shows that the radius of curvature must be as great as possible and the speed as small as possible, which can be reached by structural measures, for example, through decreasing the partial current quantity according to Equation 2. Equation 2 requires reducing the Reynolds number Re below the alteration index, if necessary through reduction of the speed, which for example is possible by decreasing the quantity of suspension according to Equation 2, but this is on technical grounds and not always desirable.

The following discussion is based on FIGS. 9 to 11.

By dividing the passages 7 into several (two to five) partial passages of breadth 1 by the use of guiding baffles 109 of relatively large radius of curvature $r'$ operating together to direct the flow, the hydraulic requirements for obtaining a laminar flow according to Equation 2 and for preventing separating swirls according to Equation 1 are fulfilled, without influencing the circulating current volume and thereby to operation, and disturbances are in general avoided.

Then Equations 1 and 2 take new forms, namely $$I = \frac{k \cdot w^2}{r'} < I \quad (3)$$

and $$Re' = \frac{W \cdot l}{v} \quad (4)$$

where $w$=m./sec.
$k$=constant
$v$=m.$^2$/sec.

according to Equations 1 and 2 remain unchanged; on the other hand $$l < L (\text{m.})$$

$l$=breadth of space 108

$$r' \geq r (\text{m.})$$

are maintained and the requirements for reducing the separating swirl and producing a laminar flow are fulfilled.

In connection with the use of guide baffles 109 with corresponding slopes a very useful rotational flow in the zones D and C is induced, so that the removal of the accumulating sludge no longer takes place from the pockets in the sedimentation zone, but from the central sump and/or other sumps in the bottom of the sedimentation zone without disturbing the rotation.

The rotating current induced in the zones A and B by the rotation of the rotor-impeller 6 is led out of zone B through partial passages 108, by guide baffles 109 which are sloped and directed to assist the transfer of the rotation in the turning direction. This rotation develops further if the separation is accomplished with an upwardly directed flow through the space 34 into the sedimentation zone. As a necessary secondary effect, a hydraulic transverse gradient forms at the bottom of the sedimentation zone in the direction of the midpoint of the curve. This yields for the index E of this gradient generally the following equation.

$$E = \frac{v^2}{g \cdot R} \quad (5)$$

where $v$=peripheral velocity for Radius R in zone D (m./sec.)
$R$=basin radius (m.)
$g$=gravity (m./sec.$^2$)

Equation 5 shows that the hydraulic transverse gradient can be used for the promotion of sedimentation and increases towards the center of rotation. In laying out the basin 1 and the inserts 2, 3 and 4, care must be taken that lower diameter of the insert 2 is chosen as small as possible, in order to lead the heavy solids or the concentrated suspension not too far towards the outside of zone C where the hydraulic transverse gradient is low.

To this hydraulic transverse gradient, an additional improvement of the radial flow component can be added by a static gradient of the floor of the basin, so that heavy sand particles of several millimeters diameter without mechanical clearing devices are automatically swept by the resulting spiral stream over the bottom to the center and into the sludge sump 29.

An especially advantageous feature is the continuous hydraulic pressure on the sludge deposited on the bottom, by which the desired de-watering of the sludge can in some cases be increased to 50% solid content by weight, without requiring additional energy or mechanical equipment. The removal of the thick sludge from the sump 114 is accomplished in a known way with plunger pumps, suction pumps or through opening the bottom pipe 115.

Summarizing, by the sedimentation arrangement according to the invention the hydraulic removal effect is to be considered, which depends on the slope of the basin bottom as well as the transverse gradient according to Equation 3, and especially contributes to trouble-free operation.

Finally for improving the sludge thickening it is also important to prevent turbulence or too great a volume of sludge with disturbance of the clarifying effect in the basin, that is, the gravimetric sedimentation operation should not be interfered with by the induced hydraulic conditions. For this the following measures are useful.

(1) Through the induced laminar or layered spiral flow, the suspension maintains at the outlet of channels 108 a smooth, non-turbulent flow path, as was formerly true only of outwardly directed radial currents. Thus the solids can deposit more readily and in larger quantities.

(2) Through the spiral rising of the flow on the basin wall, much smaller disturbing eddies are formed than with conventional perpendicular upflow (with reference to flow in a plane).

(3) By leading the suspension back into the zone A, the spiral flow is additionally deflected downward, so that the sedimentation operation is assisted. For this it is important that the back flow space 34 have a width selected in accordance with the quantity of suspension and sludge. Advantageously, in addition to the space 34, vertical slits 111 with adjustable guide blades 116 are provided in the lower part of insert 2, which, in conjunction with a throttling or change in direction of the upwardly or downwardly directed flow also especially permit a transfer of the rotation current into the sedimentation zone, without disturbing the sludge flow from zone C through space 34 into zone A.

Alternatively or additionally vertically adjustable diaphragms or valves 112 are located in the lower part of insert 2, for producing the same effect or an improvement, as a regulation of the backflow of the prethickened sludge from sedimentation zone C through the slot 34 to the zone A. Normally a part of the sludge in the sump 114 at the bottom of the sedimentation zone is removed in any suitable way.

(4) The solid materials fed to or fed back into the zone A are in general very heavy and difficult to coagulate and not suited for that purpose. Their removal follows through a central bottom sump 23, which is filled through the inward spiral current. In order to improve the removal of water, or to get a continuous leading in of sludge, a pipe 113 is located on the bottom plate 22, which extends into the pipe 20 or into the extended tube 19 and operates as an injector if the rotor impeller 6 is sucking in fluid. In this way a pre-determined quantity of fluid is sucked out of the sump 23 continuously, which in connection with the adjustment of the diameter of the pipes 113 and the flow speed in the pipe 20 or draft tube 19 is kept at such a value that solids in the sump 23 are not taken up with it. Through this continuous removal of fluid through the sludge which has been led in, it is possible to lead in the sludge continuously. The central offtake of the highly-thickened sludge is, in correspondence with the quantity deposited or the desired concentration, continuously or periodically removed.

Former attempts to use in conventional round clearing basins hydraulic clearing effects such as the transverse gradient failed principally because the procedural requirements for the sludge characteristics were not observed. Especially the continuous upward flow on the inside of the sedimentation zone caused disturbances, so that too much solid material were carried into the clarification zone.

In the present arrangement the previously disturbing upward current is separated into zones A and B, so that the separation and clarification effects are in general not disturbed.

In operating with complete or partial upward flow in the sedimentation zone (sludge-blanket process), the sludge deposits on the wider and hydraulically generally undisturbed bottom of the sedimentation zone C, in order to be removed by the transverse flow effect into th sump 114, which is located in this bottom. A disurbance of the settling is not possible if the current through the slits 111 and the diaphragms 112 corresponds to the quantity of sludge settling out. In general, in sedimentation zone C, through gravimetric separation of solids, in each case a reduction of the suspension concentration and therewith of the sludge volume is reached and the desired mild turbulence with coagulation-encouraging operation results.

Independently of the foregoing considerations, the insertion of mechanical removal arrangements in special cases is not excluded; however, taking everything into account, a broader range of use for the process is achieved.

An advantage of the foregoing points especially to be considered is that the speed of rotation of the rotor-impeller 6 can be selected high enough to achieve, according to Formula 5, a strong dynamic transverse gradient, without too great a quantity of suspension being led into the sedimentation zone and avoiding turbulent disturbances there.

As to the structure, especially for the depth of the round basin, it is very useful that the gradient of the basin bottom (that is, static transverse gradients) is no longer dependent on the angle of repose of the watery solids and can be kept essentially much flatter (between 3° and 30°), because by the back-flow of sludge to the zone A, the dynamic transverse gradient comes into play. But the dynamic transverse gradient can be very strong, as precipitating procedures by fluid curves and Formula 5 show. The use of this gradient for the capture of sand is a known expedient with a special working technique of skilled operators.

In the space gained through the relatively flat construction of the bottom of the basin, a considerable quantity of sludge can be present in the form of a cushion, so that the sludge impact is easily taken up, or with insufficient sludge offtake the effectiveness of the water separation is less disturbed. The following is a procedure for carrying out the invention.

Well water, which has a mean temperature of 9° C. is to be converted at 200 to 450 m.$^3$/h. hour to drinking water. The well water has a total hardness of 28° dH, a carbonization hardness of 14° dH and contains in each liter 14 p.p.m. of iron, 3 p.p.m. of manganese, 45 p.p.m. of carbon-dioxide and traces of $H_2S$.

Through a de-carbonization of the well water through dosage with 300 mg. of lime per liter, there is produced simultaneously a precipitation of the iron and the manganese as well as a stabilization. The sedimentation velocity of the flocculate of iron hydroxide and manganese hydroxide, as found by previous testing, is about 3.5 m./h. According to this procedure, especially in considertion of the fluctuating through-put, an arrangement according to the suspension-circulation process with an interior basin diameter of 11.6 m. and an interior structure height of 4.65 m. is selected. The rotor-impeller has a diameter of 2.7 m. and is driven by a motor with 5 H.P. and 3 to 9 r.p.m., so that a maximum rotation of about 1200 m.$^3$/h. is reached.

By use of this arrangement, the required clarification cannot be reached. Instead of 10 p.p.m. of turbidity, over 20 and up to 60 p.p.m. are found in the clear water. Deposits of calcium carbonate in the clarified water taken off show that the water treated is not stable. Besides sludge deposits form on the bottom of the basin with a solid content up to 50% by weight, which stop up completely the space 34 and break the back-flow of the suspension.

The high turbidity in the clear water is the consequence of too high turbulence in the sedimentation zone C through which solids are carried up by eddies into the clarification zone D. The inadequate stability of the treated water is the consequence of too small a dwell time of the water in the apparatus, or an insufficient contact between the raw water and the suspended reaction products.

For testing the flow content in the sedimentation zone, an arrangement according to FIG. 12 is used. On the bridge 201 which extends above the basin a laboratory balance 202 with a readable accuracy of 0.1 g. is located.

On one arm of the balance by means of a thread 203, a circular disc 204 is so suspended that it is balanced a short distance above the narrowest part of the back-flow space 34 through a grate located in the scale pan 105. At the beginning, with the measuring arrangement with the well water influx shut off and the rotor-impeller 6 stationary, the disc is balanced on a scale 202. At different turning speeds are the rotor-impeller and different quantities of water in-feed, the disc 204 rises or falls, which is compensated by decreasing or increasing the weight on the scale pan 205. The additional weight in the scale pan corresponds to the flow resistance W, from which according to the following formulas the current velocity $w$ can be determined.

For the determination of the fluid quantity flowing through the space 34 the following formula is used:

(1) $$W = c.f.\frac{\varphi}{2}.w^2$$

In this,
$W$ = the current resistance in kilograms
$c$ = the resistance value
$f$ = the surface of the disc in m.$^2$
$\varphi$ = the density of water $$\frac{102 \text{ kg. sec.}^2}{m_4}$$

$w$ = the current velocity (m./sec.)

In this equation the constant $c, f, \varphi$ can be combined into a constant $k$. Then Equation 1 has the following form:

(2) $$W = k.w^2$$

Because the flow resistance W is measured with the scale, it corresponds with the balance weight P in the scale pan 205. This gives us the following:

(3) $$P = k.w^2$$

and, solving for $w$:

(4) $$w = \sqrt{\frac{P}{k}}$$

With the help of a known current cross-section of the sedimentation zone at the height of the disc, the direction and the quantity of the suspension flowing through the space 34 can be determined. From the flow of raw water and the speed of rotation of the rotor-impeller while considering the continuity requirements, the partial quantities which flow into the sedimentation zone C are known.

In the arrangement shown in the drawing, disc 204 has a diameter of 300 mm. In the construction shown it hangs at a distance of 0.75 m. above sedimentation basin bottom, so that the mid-point of the disc lies in the divisor of the angle between the cylindrical part of the bell 2 and the sloping outer wall.

In the constant $k$,
The resistance value $c$ equals 1.11 (according to Dubbel, 11. Auflage, Bd. 1, page 299);
The surface of the disc for a diameter of 30 cm., is 0.07 m$^2$.
The density $\varphi$ of water is $$\frac{1.02 \text{ kg. sec.}^2}{m4}$$

$k$ then equals $$\frac{3.95 \text{ kg. sec.}^2}{m4}$$

In initial position of the measuring arrangement, $Po = 51.0$ g. at a throughput of 450 m.$^3$ of raw water per hour, and a suspension current from the zone B into the sedimentation zone C of 800 m.$^3$/hr., the suspension backflow from the sedimentation zone C into the mixing zone A through the space 34 is 350 m.$^3$/hr. This value is derived from Formula 4 through insertion therein of $P1 = 7.1$, the weight required for the compensation of the slack. From the flow velocity $w$ and the ring-shaped transverse flow-section F of the sedimentation zone at the height of the disc ($F = 2.35$ m.$^2$) results the value of 350 m.$^3$ per hour.

The operation is as above described inadequate.

By a decrease of the suspension stream passing through the rotor-impeller, the disc has a slack which is compensated through a decrease of the weight $P2 = 3.55$. Formula 4 gives an upwardly-directed current velocity $$w2 = \sqrt{\frac{P2}{3.95}} = \sqrt{\frac{0.00355}{3.95}} = 0.03 \text{ m./sec.}$$

which, with reference to the ring-shaped flow cross-section of the sedimentation zone at the height of the disc (F equals 2.35 m.$^2$) gives a flow volume of 250 m$^3$. per hour.

From the fed-in 450 m.$^3$/h. of raw water, 250 m.$^3$/h., or 55%, flow out of the zone A through the space 34 into the sedimentation zone C and the remaining 200 m.$^3$/h. or 45%, flows out of the distribution zone B into the sedimentation zone C.

45% of the raw water is dynamically purified and 55% of the raw water is filtered through the sludge-blanket. With this method of operation of the arrangement, the clarification effect is substantially improved and after the reaction in the treated water is fully suppressed. The effective dwell time during the dynamic clarification of the partial stream of 45% is increased in the primary and secondary zones up to about 140%. The more satisfactory dwell time after the treatment in the sludge-blanket process is increased through a reduction to a partial stream of 55% up to 1.82 times.

In order to keep this current proportion relatively constant, the extended draft tube 19 is provided in connection with the rotor-impeller 6. By this draft tube the rotation current existing in zone A is led back to the basin bottom, so that the resulting transverse current on the basin bottom hinders deposition of sludge. Through the longer current path, the dwell time in the upper partial stream is also increased.

The concentration at the sludge pockets 32 of the periodically removed sludge can be 4.5 to 6% by weight, substantially higher than in the 100% sludge-blanket process, which only gives 1% to 3% by weight. In this connection the arrangement operates without trouble and maintains a positive determined value.

While I have described herein some embodiments of my invention, I wish it to be understood that I do not intend to limit myself thereby except within the scope of the claims hereto or hereinafter appended.

I claim:
1. Apparatus for clarifying liquids, comprising a substantially round basin, a plurality of walls within the basin dividing it into an inner lower mixing zone, an inner upper distribution zone, and an outer sedimentation zone with a clarification zone thereabove, said walls providing communication at the bottom between the mixing zone and the sedimentation zone, comprising means forming a plurality of passages between the distribution zone and the mixing and sedimentation zones, means to feed suspension from the mixing zone to the distribution zone, and means for selectively varying the cross-section of said passages so as to control the relative flow therethrough, said feed means comprising an axial pipe arranged in said mixing zone having openings at its lower end, a rotor-impeller in the bottom of the distribution zone having a draft tube extending into said pipe, and a throttling valve in said pipe.

2. In apparatus as claimed in claim 1, means in the mixing zone adjacent the top thereof to produce an outwardly directed flow of the suspension in the top part of said zone.

3. In apparatus as claimed in claim 1, a plurality of guide baffles in the passage between the distribution zone and the sedimentation zone.

4. In apparatus as claimed in claim 3, said baffles sloping in the direction of rotation of the feed means.

5. Process for clarification of liquids containing suspended solids in a substantially round basin having therein an inner lower mixing zone, an inner upper distribution zone, a peripheral outer sedimentation zone and a clarification zone above the sedimentation zone, in which at least a part of the suspension is circulated through the mixing, distribution and sedimentation zones, the step of dividing the circulating part of the suspension within the inner zones into at least two streams one of which flows from the mixing zone into the sedimentation zone at a first level in the sedimentation zone near the bottom of the sedimentation zone and from such first level upwardly in the sedimentation zone and the other of which flows from the distribution zone into the sedimentation zone at a second level in the sedimentation zone adjacent the top of the sedimentation zone and spaced a substantial distance above said first level and from said second level downwardly in the sedimentation zone.

6. In a process as claimed in claim 5, imparting helical outward and downward flow to a different part of the suspension in the upper part of the mixing zone.

7. Apparatus for clarifying liquids, comprising a substantially round basin, a plurality of walls within the basin dividing it into an inner lower mixing zone, an inner upper distribution zone, and an outer sedimentation zone with a clarification zone thereabove, said walls providing communication at the bottom between the mixing zone and the sedimentation zone, means to circulate at least a part of the liquid from the central bottom portion of the mixing zone to the distribution zone and from the distribution zone to the mixing and sedimentation zones, and adjustable means for selectively providing upward, downward, or simultaneous flow from below upwardly and from above downwardly in the sedimentation zone, means to feed liquid to be clarified to the mixing zone adjacent the top thereof, means in the mixing zone adjacent the top thereof to produce an outwardly directed flow of a part of the liquid different from the circulating part in the top part of said zone, said circulating means comprising an axial pipe arranged in said mixing zone having openings at its lower end, a rotor-impeller in the bottom of the distribution zone having a draft tube extending into said pipe, said flow producing means comprising blades located outside the axial pipe connected to said rotor-impeller and rotatable therewith.

8. In apparatus as claimed in claim 7, a packing associated with said rotor-impeller to limit flow of suspension thereby between the mixing and distribution zones.

9. Apparatus for clarifying liquids, comprising a substantially round basin, a plurality of walls within the basin dividing it into an inner lower mixing zone, an inner upper distribution zone, and an outer sedimentation zone with a clarification zone thereabove, said walls providing communication at the bottom between the mixing zone and the sedimentation zone, means to circulate at least a part of the liquid from the central bottom portion of the mixing zone to the distribution zone and from the distribution zone to the mixing and sedimentation zones, and adjustable means for selectively providing upward, downward, or simultaneous flow from below upwardly and from above downwardly in the sedimentation zone, said circulating means comprising an axial pipe arranged in said mixing zone having openings at its lower end, a rotor-impeller in the bottom of the distribution zone having a draft tube extending into said pipe, and means in the mixing zone adjacent the top thereof to produce an outwardly directed flow of the suspension in the top part of said zone, said flow producing means comprising blades outside of said pipe connected to said rotor-impeller and rotatable therewith.

10. Apparatus for clarifying liquids, comprising a substantially round basin, a plurality of walls within the basin dividing it into an inner lower mixing zone, an inner upper distribution zone, and an outer sedimentation zone with a clarification zone thereabove, said walls providing communication at the bottom between the mixing zone and the sedimentation zone, means to circulate at least a part of the liquid from the central bottom portion of the mixing zone to the distribution zone and from the distribution zone to the mixing and sedimentation zones, and adjustable means for selectively providing upward, downward, or simultaneous flow from below upwardly and from above downwardly in the sedimentation zone, said circulating means comprising an axial pipe arranged in said mixing zone having openings at its lower end, a rotor-impeller in the bottom of the distribution zone having a draft tube extending into said pipe.

11. In apparatus as claimed in claim 10, said draft tube fitting slidably in said pipe, and means mounting the rotor-impeller and pipe for vertical movement to control the size of said openings.

12. Apparatus for clarifying liquids, comprising a substantially round basin, a plurality of walls within the basin dividing it into an inner lower mixing zone, an inner upper distribution zone, and an outer sedimentation zone with a clarification zone thereabove, said walls providing communication at the bottom between the mixing zone and the sedimentation zone, means to circulate at least a part of the liquid from the central bottom portion of the mixing zone to the distribution zone and from the distribution zone to the mixing and sedimentation zones, and adjustable means for selectively providing upward, downward, or simultaneous flow from below upwardly and from above downwardly in the sedimentation zone, said circulating means comprising an axial pipe arranged in said mixing zone having openings at its lower end, a rotor-impeller in the bottom of the distribution zone having a draft tube extending into said pipe, said rotor-impeller having a lower disc and said dividing wall between the mixing and distribution zones including a vertical cylindrical flange adjacent the periphery of the disc, means mounting the rotor-impeller and flange for relative vertical movement therebetween to vary the output of the rotor-impeller.

13. Apparatus for clarifying liquids, comprising a substantially round basin, a plurality of walls within the basin dividing it into an inner lower mixing zone, an inner upper distribution zone, and an outer sedimentation zone with a clarification zone thereabove, said walls providing communication at the bottom between the mixing zone and the sedimentation zone, means to circulate at least a part of the liquid from the central bottom portion of the mixing zone to the distribution zone and from the distribution zone to the mixing and sedimentation zones, and adjustable means for selectively providing upward, downward, or simultaneous flow from below upwardly and from above downwardly in the sedimentation zone, said circulating means comprising an axial pipe arranged in said mixing zone having openings at its lower end, a rotor-impeller in the bottom of the distribution zone having a draft tube extending into said pipe, said rotor-impeller having a lower disc and said dividing wall between the mixing and distribution zones having flap valves therein movable into the path of liquid fed through the rotor-impeller to return a part of such liquid to the mixing zone.

14. Apparatus for clarifying liquids, comprising a substantially round basin, a plurality of walls within the basin dividing it into an inner lower mixing zone, an inner upper distribution zone, and an outer sedimentation zone with a clarification zone thereabove, said walls providing communication at the bottom between the mixing zone and the sedimentation zone, means to circulate at least a part of the liquid from the central bottom portion of the mixing zone to the distribution zone and from the distribution zone to the mixing and sedimentation zones, and adjustable means for selectively providing upward, downward, or simultaneous flow from below upwardly and from above downwardly in the sedimentation zone, said circulating means comprising an axial pipe arranged in said mixing zone having openings at its lower end, a rotor-impeller in the bottom of the distribution zone having a draft tube extending into said pipe, said circulating means including suction pipe means carried by said rotor-impeller having one end opening into the distribution zone adjacent the center thereof and having the other end opening into the mixing zone adjacent the periphery thereof to suck suspension from the distribution zone into the mixing zone.

15. In apparatus as claimed in claim 14, valve means associated with said pipe means to control the flow therethrough.

16. Apparatus for clarifying liquids, comprising a substantially round basin, a plurality of walls within the basin dividing it into an inner lower mixing zone, an inner upper distribution zone, and an outer sedimentation zone with a clarification zone thereabove, said walls providing communication at the bottom between the mixing zone and the sedimentation zone, means to circulate at least a part of the liquid from the central bottom portion of the mixing zone to the distribution zone and from the distribution zone to the mixing and sedimentation zones, and adjustable means for selectively providing upward, downward, or simultaneous flow from below upwardly and from above downwardly in the sedimentation zone, one of the walls separating the mixing zone from the clarification zone being a vertical wall and such vertical wall having its lower edge spaced from the bottom of the basin to provide said communication therebetween, the lower portion of said wall having slits therein, and means to adjust the open cross-section of said slits.

17. Apparatus for clarifying liquids, comprising a substantially round basin, a plurality of walls within the basin dividing it into an inner lower mixing zone, an inner upper distribution zone, and an outer sedimentation zone with a clarification zone thereabove, said walls providing communication at the bottom between the mixing zone and the sedimentation zone, means to circulate at least a part of the liquid from the central bottom portion of the mixing zone to the distribution zone and from the distribution zone to the mixing and sedimentation zones, and adjustable means for selectively providing upward, downward, or simultaneous flow from below upwardly and from above downwardly in the sedimentation zone, said circulating means comprising an axial pipe arranged in said mixing zone having openings at its lower end, a rotor-impeller in the bottom of the distribution zone having a draft tube extending into said pipe, a bottom plate, a sump below the bottom plate, an injection pipe mounted on and extending through said bottom plate into said axial pipe to suck in by injection part of water out of said sump.

18. Apparatus for clarifying liquids, comprising a substantially round basin, a plurality of walls within the basin dividing it into an inner lower mixing zone, an inner upper distribution zone, and an outer sedimentation zone with a clarification zone thereabove, said walls providing communication at the bottom between the mixing zone and the sedimentation zone, means to circulate at least a part of the liquid through the mixing, distribution and sedimentation zones, and means within said inner zones for dividing the circulating part of the liquid into at least two streams one of which flows from the bottom of the inner zones upwardly and the other from the top of the inner zones downwardly in the sedimentation zone, said circulating means including an axial pipe having an opening at its lower end centrally arranged in said mixing zone, and a rotor-impeller in the bottom of the distribution zone operatively connected with said pipe for drawing liquid upwardly from the lower part of the mixing zone, and means in the upper central part of the mixing zone, outside of said pipe, to impart helical outward flow towards the bottom of the basin to the liquid therein.

19. In a device as claimed in claim 18, said means for dividing the circulating part of the liquid into streams comprising means forming first passages from the distribution zone to the sedimentation zone, means forming said second passages from the distribution zone to the mixing zone, the first passages being angularly displaced with respect to the second passages around the vertical axis of the basin, and means for selectively opening and closing said passages.

References Cited in the file of this patent

UNITED STATES PATENTS

| | | |
|---|---|---|
| 2,427,886 | Walker | Sept. 23, 1947 |
| 2,509,683 | Green | May 30, 1950 |
| 2,613,181 | Green et al. | Oct. 7, 1952 |
| 2,643,976 | Sebald | June 30, 1953 |
| 2,938,867 | Griffin | May 31, 1960 |

OTHER REFERENCES

Spafford et al.: Illinois's Experiences in Lime Softening With Short-Time Upward Flow Clarification, J. AWWA, vol. 31, October 1939, pp. 1734–1754.

Infilco, The Accelator, a publication of Infilco Inc., Tucson, Ariz., Bul. 1825–D, 1957, 27 pp.